Figure 1:
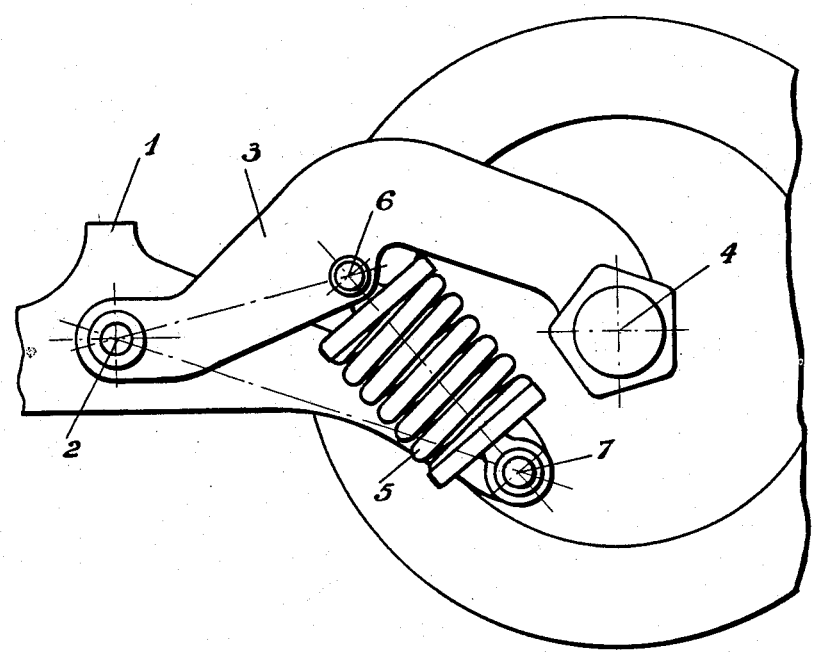

Nov. 4, 1952　　　J. A. GREGOIRE　　　2,616,686
SUSPENSION MEANS FOR VEHICLES
Filed Nov. 1, 1945　　　3 Sheets-Sheet 1

JEAN ALBERT GREGOIRE
INVENTOR
Jewett and Jurad
ATTORNEYS

Nov. 4, 1952  J. A. GREGOIRE  2,616,686
SUSPENSION MEANS FOR VEHICLES
Filed Nov. 1, 1945  3 Sheets-Sheet 2
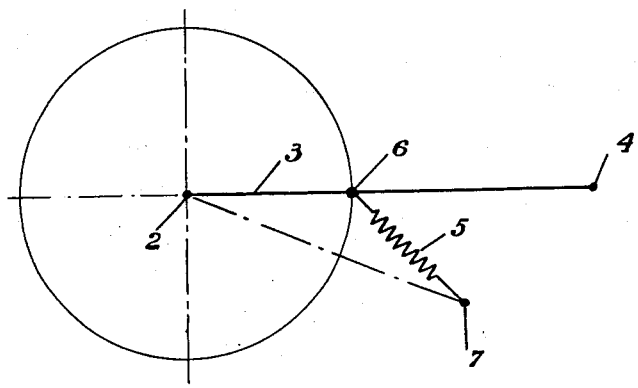
Fig. 3
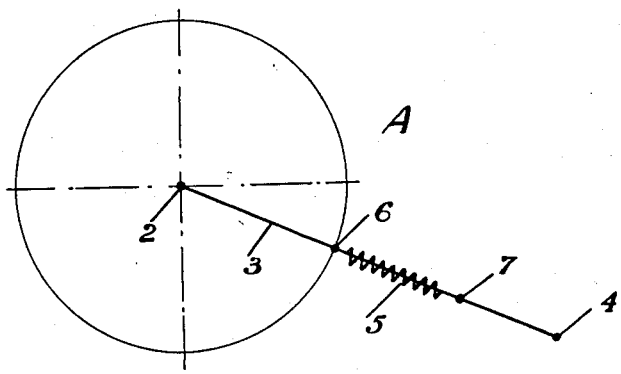
Fig. 3'
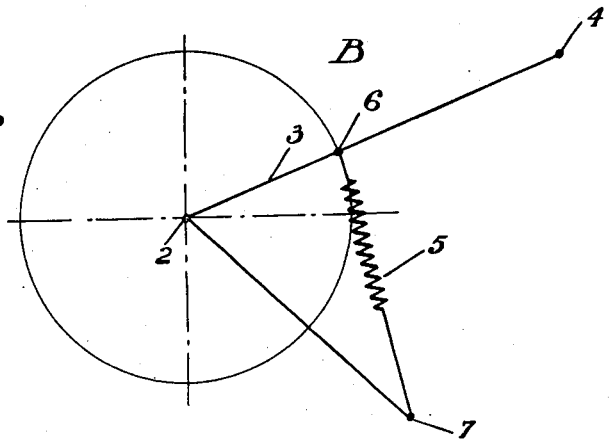
Fig. 3"
JEAN ALBERT GREGOIRE
INVENTOR
Jewett and Mead
ATTORNEYS Patented Nov. 4, 1952

2,616,686

UNITED STATES PATENT OFFICE 2,616,686

SUSPENSION MEANS FOR VEHICLES

Jean Albert Gregoire, Paris, France

Application November 1, 1945, Serial No. 626,101
In France May 24, 1944

Section 1, Public Law 690, August 8, 1946
Patent expires May 24, 1964

10 Claims. (Cl. 267—20)

The execution of a good suspension on vehicles of any kind and in particular for automobile vehicles leads to a number of well known intricate problems which it has not been possible heretofore to solve in a simple manner. The suspension elements as they are at present mounted, whether in the case of spring or rubber systems or the like equivalent devices have the characteristic feature of showing what is usually known under the name of constant flexibility i. e. their deformation is proportional to the load to which they are submitted; thus in the case of a spring mounted in the usual manner, for instance, the carriage or body sinks with reference to the wheel to an extent which is strictly proportional to the weight of said carriage and of its contents: when the carriage is empty, the amount of sinking is very small as it corresponds only to the weight of said carriage; when the carriage is loaded, it is on the contrary important.

Now it is known that for the securing of a good and soft suspension, it is necessary to provide for a high sensitivity, but obviously, there is a limit in this direction due to the fact that it is not possible to increase too considerably the possibility of displacement of the carriage with reference to the wheel, which possibility of displacement should be obviously such that the carriage when it is loaded to its maximum may continue to be submitted to considerable shocks. The yieldingness of the spring is therefore calculated and designed in a manner such that for the maximum load of the carriage, the suspension continues being satisfactory but with such a suspension, when the carriage is loaded only to a small extent, in the case of a motorbus for instance, when it contains only the passengers, the sinking of the carriage is comparatively small as it is proportional to the weight of said carriage and consequently the suspension is too hard.

In brief, in the case of the usual suspension devices having a constant sensitivity, the suspension, which is designed so as to be satisfactory when the vehicle is under full load, is much too hard when the vehicle is loaded only to a small extent.

It has been proposed to remove this drawback by means of so-called variable flexibility devices; with these devices it is attempted to provide for a sinking of the carriage with reference to the wheels which may not be proportional to the load. It should be comparatively considerable when the load is small and on the contrary comparatively small when the load is more considerable. To obtain this result, and by reason of the fact that as disclosed hereinabove, springs and other equivalent devices show a deformation which is proportional to the load, different systems have been proposed: in particular there are provided systems of a plurality of springs which become operative only in sequence with gradually increasing loads of the carriage: a single spring having a comparatively high sensitivity supports the carriage when it is empty or under slight load; when the latter is loaded to a great extent, a further spring becomes operative and so on. This leads to a comparatively satisfactory result but the arrangement is also rather intricate in particular when it is desired to provide for a suspension including coil springs.

My invention has for its objects the execution of a suspension device having a variable sensitivity and using for suspension purposes only one spring or group of springs working in unison.

This arrangement may moreover be mounted at the same time with a spring having a constant flexibility so as to act through the composition of the two flexibilities which provides a variable resultant so as to form correcting means for the suspension.

To this end, and in conformity with the invention in the case of coil springs or the like means operating through traction or compression and associated with wheels or axles carried by levers pivotally secured to the frame, I arrange said springs in a manner such that for the mean position of the lever, corresponding to a vehicle under load, they may be directed obliquely with reference to the lever arm to which they are pivotally secured instead of having a substantially perpendicular position.

In conformity with the invention, it is possible to obtain in particular, under such conditions, a good suspension with a variable flexibility by keeping the different variables playing a part in said type of suspension, inside predetermined limits to be disclosed hereinafter.

Figure 2:
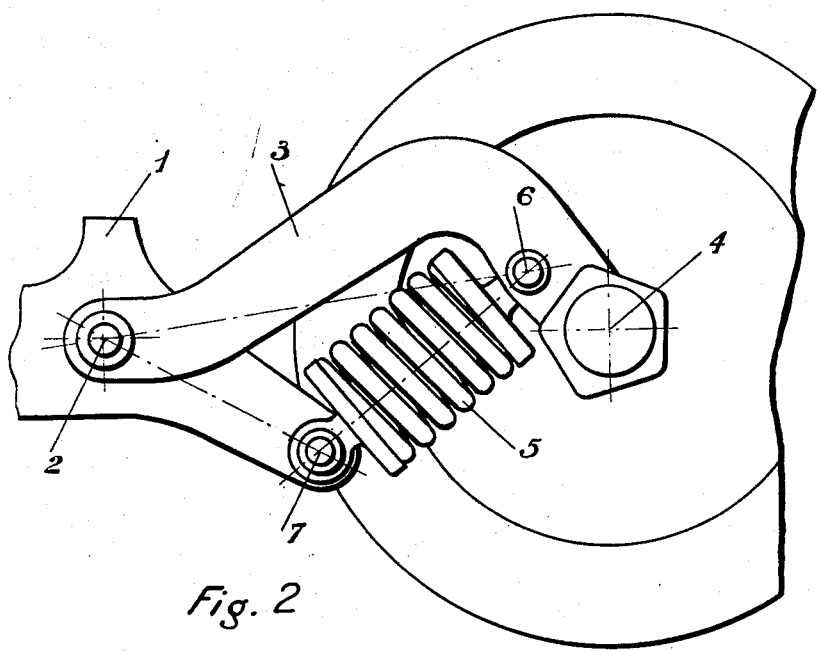

Other objects and advantageous features of the present invention will appear moreover in the reading of the following description relating to forms of execution illustrated in accompanying drawings showing, by way of example and without any limitation on the scope of the invention, various forms of execution of my invention. In said drawings:

Figs. 1 and 2 are diagrammatic views showing two different arrangements of the coil spring in a suspension executed in conformity with my invention.

Figs. 3, 3', and 3'' show the extreme limit positions beyond which the suspension means should not pass in the case of tractionally operative springs.

Figure 4:
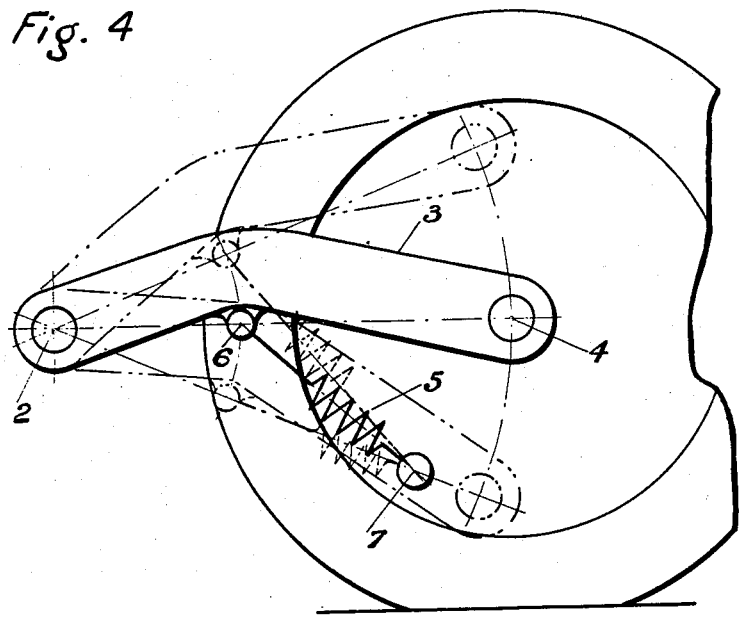
Figure 5:
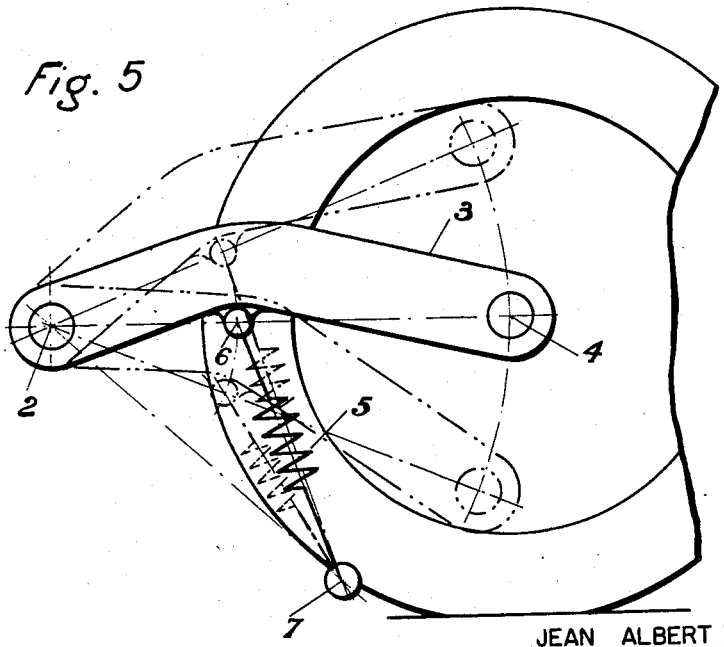

Figs. 4 and 5 show two practical forms of execution of suspensions answering such conditions.

In Figs. 1 and 2, I designates the carriage or frame of an automobile carriage pivotally secured at 2 to a lever 3 the other end of which carries the wheel 5 in a manner known per se.

Between the lever 3 and the carriage, is inserted a suspension spring 5 which is adapted to operate through tension and which is secured at 6 to the lever and at 7 to the frame or carriage of the vehicle.

Said Figures 1 and 2 show the suspension for the mean position of the pivoted lever which corresponds to a statically loaded carriage i. e. for a carriage which is stationary; in this case the line 2—4 is substantially horizontal.

In prior practice the spring 5 is substantially perpendicular to the lever 3 or more accurately to the line 2—4 in said mean position and remains substantially perpendicular to said lever when the latter assumes the different possible positions for the suspension i. e. for the different angular positions of the spring. Consequently the lengthening or shortening of the spring remains substantially proportional to the vertical displacement of the wheel with reference to the frame, so that the suspension retains a constant flexibility. In the arrangements executed in conformity with my invention, on the contrary, the spring 5 is arranged obliquely with reference to the lever 3 for the mean position of said lever as illustrated in Figs. 1 and 2, the direction of obliquity having no importance from a theoretical standpoint and being chosen in practice as in Fig. 1 or Fig. 2 in accordance with the possibility allowed for an easy mounting, the case illustrated in Fig. 2 being generally of greater advantage, and according to the variations in flexibility which are desired.

Figs. 3, 3', and 3" illustrate diagrammatically the limits between which it is preferable in practice to provide for the cooperation between the spring and the lever in accordance with my invention.

It is known in fact that in practice whatever may be the suspension means, the lever carrying the wheel should preferably rock between about 20 and 45°, said rocking corresponding to an angular displacement of said lever between the positions corresponding to zero load and maximum load.

Now experience has shown that when it is desired to execute a suspension in conformity with by invention, it is necessary for the angular motion of the lever to be comprised inside an angle of 65° to be defined hereinafter.

In Fig. 3 as in the preceding figures, the lever 3 is pivotally secured at 2 to the frame and the spring 5 is pivotally secured on one hand at 6 to said lever and at 7 to the frame.

Under such conditions, the limits between which it is possible to make the lever arm 3 rock with reference to the frame for obtaining a suspension having a variable flexibility should be comprised between the position A (Fig. 3') for which the spring 5 is in alignment with the lever arm 3 and the position B (Fig. 3") for which the lever 3 forms an angle of 65° with reference to the position corresponding to the alignment of the spring. Consequently the angular movement considered should be comprised inside these extreme positions.

Thus Figs. 4 and 5 show two forms of execution of a suspension which is applicable with an angular movement of 45°.

In the example illustrated in Fig. 4, there is chosen as a lower limit position of the lever corresponding to an empty vehicle, the position for which the spring is in alignment with said lever, which position corresponds to the position shown in Fig. 3'. The lever is then allowed an upwardly directed rotary movement through 45° with reference to said limit position: the characteristic features of the spring, flexibility and original tension, are then chosen in a manner such that for the two extreme angular positions allowed for the lever, its tension may correspond to the load it may have to bear.

In Fig. 5, I have chosen on the contrary the upper limit position of the spring, which position corresponds to that of Fig. 3 and for which the lever arm forms an angle of 65° with the position which it would assume for making the spring come into alignment therewith.

Starting from this limit position corresponding to a loaded vehicle, the lever arm is allowed to pivot as precedingly through angles up to 45° but downwards, the limit position of 45° corresponding to an empty vehicle. It is also possible to choose any intermediary position between the position of Fig. 4 and of Fig. 5.

It should also be noticed that in conformity with my invention, not only the angular position of the different elements should be kept within certain limits but the ratios between the different elements govering the suspension i. e. the distance 6—7 which will be termed R and the distance 2—7 which will be termed L should also be held between certain limits. It has been found that the ratio R/L should be advantageously comprised between the following limits: $\frac{1}{4}$ and $\frac{2}{3}$.

Moreover the length of the spring in its unloaded condition between axes should be chosen equal to or slightly above or below the length L—R.

In the above described arrangements, it has been assumed that the point at which the spring is secured to the lever has been chosen between the point at which the lever is pivotally secured to the frame and the center of the wheel. According to my invention, it is also possible to choose this pivoting point on an independent lever arm rigid with the lever and adapted to be adjusted in any position with reference thereto in accordance with the constructional possibilities of the vehicle.

Numerous modifications may of course be brought to the above described devices without widening the scope of the invention. In particular, instead of a single spring, it is possible to make use of two or more suitably arranged springs. It is also possible to use any equivalent devices such as rubber elements, pneumatic means, etc.

Obviously the suspension system which has been illustrated only as applied to the rear wheels may also be used for the front wheels. It may also be associated with any damping méans. On the other hand, instead of being used as described in a single suspension system, it may also be associated with a suspension device of another type having a constant flexibility for instance so as to correct the properties of these suspensions of another type with a view to obtaining a flexibility varying within the desired limits.

Having now particularly described and ascertained the nature of my invention and the manner in which the same is to be executed, I declare that what I claim is:

1. In an automobile or the like vehicle, a suspension system for the suspended component of the vehicle comprising a vehicle wheel, an arm pivotally connected with the wheel and with the suspended component, a projection of the suspended component beyond the point at which it is pivotally connected to said arm, and elastic suspension means operating under tractional conditions and pivotally secured to a point of said arm and to a point of said projection lying nearer the axis of the wheel than the point at which the arm is pivotally secured to the suspended component, said suspension means assuming for all possible relative positions of the wheel with reference to the suspended component a length that is less than the length of the arm between its pivoting points on the suspended component and on the wheel, and the point of connection between the suspension means and the projection lying at a distance from the point at which the arm is pivotally secured to the suspended component that is less than said length of said arm, the axis of the suspension means forming, when the vehicle is under minimum load, an angle with the line connecting the pivoting point of the arm with reference to the suspended component with the point of connection between the suspension means and said arm, an angle that increases with the load, the length of the suspension means when submitted to zero load being substantially equal to the difference in the lengths separating the point at which the arm is pivotally secured to the suspended component from the two pivotally secured ends of the suspension means respectively.

2. In an automobile or the like vehicle, a suspension system for the suspended component of the vehicle comprising a vehicle wheel, an arm pivotally connected with the wheel and with the suspended component, a projection of the suspended component beyond the point at which it is pivotally connected to said arm, and a spring operating under tractional conditions and pivotally secured to a point of said arm and to a point of said projection lying nearer the axis of the wheel than the point at which the arm is pivotally secured to the suspended component, said spring assuming for all possible relative positions of the wheel with reference to the suspended component a length that is less than the length of the arm between its pivoting points on the suspended component and on the wheel, and the point of connection between the spring and the projection lying at a distance from the point at which the arm is pivotally secured to the suspended component that is less than said length of said arm, the axis of the spring forming, when the vehicle is under minimum load, an angle with the line connecting the pivoting point of the arm with reference to the suspended component with the point of connection between the spring and said arm, an angle that increases with the load, the length of the suspension means when submitted to zero load being substantially equal to the difference in the lengths separating the point at which the arm is pivotally secured to the suspended component from the two pivotally secured ends of the suspension means respectively.

3. In an automobile or the like vehicle, a suspension system for the suspended component of the vehicle comprising a vehicle wheel, an arm pivotally connected with the wheel and with the suspended component, a projection of the suspended component beyond the point at which it is pivotally connected to said arm, and suspension means operating under tractional conditions and pivotally secured to a point of said arm and to a point of said projection lying nearer the axis of the wheel than the point at which the arm is pivotally secured to the suspended component, said suspension means assuming for all possible relative positions of the wheel with reference to the suspended component a length that is less than the length of the arm between its pivoting points on the suspended component and on the wheel, and the point of connection between the suspension means and the projection lying at a distance from the point at which the arm is pivotally secured to the suspended component that is less than said length of said arm, the axis of the suspension means forming, when the vehicle is under minimum load, an angle with the line connecting the pivoting point of the arm with reference to the suspended component with the point of connection between the suspension means and said arm, an angle that increases with the load; the arm being adapted to move through an angle ranging between 20 and 45° inside an angle of 65° of which one side coincides with the line connecting the pivoting point of the arm with reference to the suspended component with the point of connection between the suspension means and said suspended component, the length of the suspension means when submitted to zero load being substantially equal to the difference in the lengths separating the point at which the arm is pivotally secured to the suspended component from the two pivotally secured ends of the suspension means respectively.

4. In an automobile or the like vehicle, a suspension system for the suspended component of the vehicle comprising a vehicle wheel, an arm pivotally connected with the wheel and with the suspended component, a projection of the suspended component beyond the point at which it is pivotally connected to said arm, and elastic suspension means operating under tractional conditions and pivotally secured to a point of said arm and to a point of said projection lying nearer the axis of the wheel than the point at which the arm is pivotally secured to the suspended component, said suspension means assuming for all possible relative positions of the wheel with reference to the suspended component a length that is less than the length of the arm between its pivoting points on the suspended component and on the wheel, and the point of connection between the suspension means and the projection lying at a distance from the point at which the arm is pivotally secured to the suspended component that is less than said length of said arm, the axis of the suspension means forming, when the vehicle is under minimum load, an angle with the line connecting the pivoting point of the arm with reference to the suspended component with the point of connection between the suspension means and said suspended component, an angle that increases with the load, the length of the suspension means when submitted to zero load being substantially equal to the difference in the lengths separating the point at which the arm is pivotally secured to the suspended component from the two pivotally secured ends of the suspension means respectively.

5. In an automobile or the like vehicle, a suspension system for the suspended component of the vehicle comprising a vehicle wheel, an arm pivotally connected with the wheel and with the suspended component, a projection of the suspended component beyond the point at which it is pivotally connected to said arm, and elastic suspension means operating under tractional conditions and pivotally secured to a point of said arm and to a point of said projection lying nearer the axis of the wheel than the point at which the arm is pivotally secured to the suspended component, said suspension means assuming for all possible relative positions of the wheel with reference to the suspended component a length that is less than the length of the arm between its pivoting points on the suspended component and on the wheel, and the point of connection between the suspension means and the projection lying at a distance from the point at which the arm is pivotally secured to the suspended component that is less than said length of said arm, the distance of the pivoting point of the arm on the suspended component to the axis of the suspension means being a minimum when the vehicle is under minimum load and increasing with the load, the length of the suspension means when submitted to zero load being substantially equal to the difference in the lengths separating the point at which the arm is pivotally secured to the suspended component from the two pivotally secured ends of the suspension means respectively.

6. In an automobile or the like vehicle, a suspension system for the suspended component of the vehicle comprising a vehicle wheel, an arm pivotally connected with the wheel and with the suspended component, a projection of the suspended component beyond the point at which it is pivotally connected to said arm, and elastic suspension means operating under tractional conditions and pivotally secured to a point of said arm and to a point of said projection lying nearer the axis of the wheel than the point at which the arm is pivotally secured to the suspended component, said suspension means assuming for all possible relative positions of the wheel with reference to the suspended component a length that is less than the length of the arm between its pivoting points on the suspended component and on the wheel, and the point of connection between the suspension means and the projection lying at a distance from the point at which the arm is pivotally secured to the suspended component that is less than said length of said arm, the length of the suspension means when submitted to zero load being substantially equal to the difference in the lengths separating the point at which the arm is pivotally secured to the suspended component from the two pivotally secured ends of the suspension means respectively.

7. In an automobile or the like vehicle, a suspension system for the suspended component of the vehicle, comprising a vehicle wheel, a lever pivotally connected with said wheel and with the suspended component, elastic suspension means operating under tractional conditions, and pivotally secured to a point of said lever, and to a point of said suspended component, the length of the elastic suspension means, measured when totally unloaded, being substantially equal to the difference of the lengths separating the point at which the lever is pivotally secured to the suspended component from the two pivotally secured ends of the suspension means respectively.

8. In an automobile or the like vehicle, a suspension system for the suspended component of the vehicle, comprising a vehicle wheel, a lever pivotally connected with said wheel and with the suspended component, a tractionally operating spring pivotally secured, on the one hand, to a point of said lever and, on the other hand, to a point of said suspended component, the axis of said spring forming, when the vehicle is under minimum load, an angle with the line connecting the pivoting point of the lever with reference to the suspended component, with the point of connection between the suspension means and the lever which increases with the load, while being always smaller than 90° for all positions, the length of the spring measured when totally unloaded being substantially equal to the difference of the lengths separating the point at which the lever is pivotally secured to the suspended component from the two pivotally secured ends of the spring respectively.

9. In an automobile or the like vehicle, a suspension system for the suspended component of the vehicle, comprising a vehicle wheel, a lever pivotally connected with said wheel and with the suspended component, elastic suspension means operating under tractional conditions, and pivotally secured to a point of said lever, and to a point of said suspended component, the axis of the suspension means forming, when the vehicle is under minimum load, an angle with the line connecting the pivoting point of the lever with reference to the suspended component, with the point of connection between the suspension means and the lever which increases with the load, while being always smaller than 90°, the length of the elastic suspension means, measured when totally unloaded being substantially equal to the difference of the lengths separating the point at which the lever is pivotally secured to the suspended component from the two pivotally secured ends of the suspension means respectively.

10. A spring suspension for vehicles, comprising, in combination: a lever arm pivoted to the vehicle frame and connected to the wheeled support of the vehicle for oscillation about the axis of a wheel; spring means anchored to the frame of the vehicle and to the lever arm at points so chosen that the angle between the axis of the spring means and the lever arm is other than 90°; and that the length of said spring means under zero load of the vehicle is substantially equal to the difference between the length of the arm and the distance between the arm-frame pivot and the frame-spring anchor; said spring mounted for substantially no tension when said angle is substantially zero.

JEAN ALBERT GREGOIRE.

REFERENCES CITED

The following references are of record in the file of this patent:

UNITED STATES PATENTS

| Number | Name | Date |
|---|---|---|
| 928,242 | Bollbach et al. | July 20, 1909 |
| 1,137,720 | Anderson | Apr. 27, 1915 |
| 1,877,878 | Horstmann | Sept. 20, 1932 |
| 2,315,421 | Heaslet | Mar. 30, 1943 |
| 2,351,291 | Ross | June 13, 1944 |

FOREIGN PATENTS

| Number | Country | Date |
|---|---|---|
| 303,912 | Great Britain | Jan. 14, 1929 |
| 411,824 | Great Britain | June 12, 1934 |
| 611,685 | Germany | Apr. 4, 1935 |